United States Patent [19]

Gumaer et al.

[11] Patent Number: 4,509,119
[45] Date of Patent: Apr. 2, 1985

[54] METHOD FOR MANAGING A BUFFER POOL REFERENCED BY BATCH AND INTERACTIVE PROCESSES

[75] Inventors: Robert A. Gumaer, San Jose; John A. Mortenson, Los Gatos, both of Calif.

[73] Assignee: International Business Machines Corporation, Armonk, N.Y.

[21] Appl. No.: 391,629

[22] Filed: Jun. 24, 1982

[51] Int. Cl.³ ............................................. G06F 13/00
[52] U.S. Cl. ................................................... 364/200
[58] Field of Search ... 364/200 MS File, 900 MS File, 364/300

[56] References Cited

U.S. PATENT DOCUMENTS

| | | | |
|---|---|---|---|
| 3,217,298 | 11/1965 | Kilburn et al. | 340/172.5 |
| 3,618,045 | 11/1971 | Campbell | 364/200 |
| 4,121,286 | 10/1978 | Venton et al. | 364/900 |
| 4,320,451 | 3/1982 | Bachman | 364/200 |

OTHER PUBLICATIONS

IBM Information Management System (IMS/VS) Version 1.2., ISAM/OSAM Buffer Handler, Module Headers for Source Code Modules DFSDBH10, DFSDBH20, DFSDBH30 and DFSDBH40.
IBM Operating System (OS/VS2) SAM Logic Release 3.8, QSAM Routines, IBM Publication SY26-3832-1, Second Edition, Feb. 1975, pp. 15-53 and 178-181.

Primary Examiner—James D. Thomas
Assistant Examiner—David Y. Eng
Attorney, Agent, or Firm—Shelley M. Beckstrand; R. Bruce Brodie

[57] ABSTRACT

Method for managing a buffer pool shared by sequential and random processes. A data base manager includes a buffer manager which: (1) maintains a normal least recently used (LRU) buffer chain and a sequential LRU buffer chain, the sequential LRU buffer chain being replicated on the normal LRU buffer chain; (2) places buffers released from a sequential process in both LRU buffer chains and buffers released from a random process only in the normal LRU buffer chain; and (3) responsive to a request for a buffer for a sequential process, steals the head buffer from the sequential LRU buffer chain, otherwise steals the head buffer from the normal LRU buffer chain. The buffer manager further conditionally asynchronously prefetches data set pages from the external storage device in response to a request for a data set page which is an integral multiple of a process defined prefetch quantity.

3 Claims, 4 Drawing Figures

METHOD FOR MANAGING A BUFFER POOL REFERENCED BY BATCH AND INTERACTIVE PROCESSES

BACKGROUND OF THE INVENTION

1. Field of the Invention

This invention relates to and method for operating a computing apparatus including a buffer pool. More specifically, it relates to a data base system providing for management of a buffer pool referenced by both batch and interactive processes.

2. Prior Art

Data base systems which are designed for transaction processing usually have buffer managers which are optimized for random access patterns of buffer usage. Normally, a pool of buffers is managed on a least recently used (LRU) basis, which keeps the data block in the most recently used buffer available for subsequent access by the application which is significantly more likely than access to data blocks in the least recently used buffer. This poses a performance problem for many utilities and some applications which access data in a very sequential manner. An example of such use is a utility for taking a backup copy of a data base: most blocks are retrieved in sequential order. It is desirable, when managing a buffer pool for sequential processes, to provide for data block prefetching by anticipating the need for new blocks from storage and read those into a free buffer. Such is performed by the QSAM buffering technique described in IBM OS/VS2 SAM Logic, Release 3.8, SY26-3832-1, 2nd Edition, QSAM Routines, pp. 15–53, 178–181.

Such prefetching results in a significant problem where pages of data sets assigned to a least recently used (LRU) managed buffer pool are subjected to concurrent random and sequential access patterns. Generally, the demand for sequential access to new pages occurs at a much higher rate than the demand for random access to new pages, particularly when the former entails prefetch. Consequently, the length of time during which a random page can be re-accessed in a buffer without having to be reread from external storage may be reduced to the point where it is inadequate to support the transactions performing random access. This occurs because the rate of movement of a buffer through the LRU chain is a function of buffer reassignment demand rate. A higher demand rate leads to faster movement to the head of the LRU queue, thus shortening the length of time the buffer's old content is available for reaccess.

Buffer monopolization by sequential processes is prevented by allocating to a user (i.e., random or sequential process) a buffer last used by the same user in the IBM IMS/VS Version 1.2 ISAM/OSAM Buffer Handler (source code modules DFSDBH10, DFSDBH20, DFSDBH30 and DFSDBH40—see, in particular, the PSTLR column in the characteristics table in DFSDBH20). However, the ISAM/OSAM Buffer Handler does not provide prefetch capability to enhance the performance of sequential processes.

Thus, in the prior art, buffer pools are either dedicated to batch (sequential) or random processes, or if shared, the batch processes tend to monopolize the pool, requiring unnecessary input/output operations when a random process reaccesses a data set page. Consequently, particularly in data base systems where concurrency exists between random and sequential access to data set pages assigned to a buffer pool, there exists a need for a buffer handler which will manage an LRU buffer pool for both sequential and random processes, yet will prevent unnecessary input/output (I/O) operations for random processes resulting from monopolization of the buffer pool by sequential processes, and at the same time provide such sequential processes with an asynchronous prefetch capability with minimal impact on the performance of random processes.

SUMMARY OF THE INVENTION

The invention provides a new method for operating a computing apparatus including a main processor, a plurality of main storage buffers, and at least one external storage device. The main processor is operated under control of a data base system which includes a buffer manager for allocating data set pages read from the storage device into the buffers for concurrent access by both sequential and random processes. The new method is characterized by the steps of (1) establishing a queue value; (2) maintaining a normal least recently used (LRU) buffer chain and a sequential LRU buffer chain with the sequential LRU buffer chain replicated on the normal LRU buffer chain; (3) placing buffers released from a sequential process that is not a prefetch process in both LRU buffer chains, and placing buffers released from a random process or from a sequential prefetch process only in the normal LRU buffer chain; and (4) responsive to a request for a buffer for a sequential process, stealing the head buffer from the sequential LRU buffer chain provided the number of buffers in that chain exceeds the queue value, otherwise stealing the head buffer from the normal LRU chain, thereby preventing recursive steals of buffers employed in nested sequential processes.

The new method may be further characterized by the step of (5) conditionally asynchronously prefetching data set pages from the external storage device in response to a request for a data set page which is an integral multiple of a process defined prefetch quantity.

The invention further provides a computing apparatus including a main processor, a plurality of main storage buffers and at least one external storage device. The main processor is operated under control of a data base system which includes a buffer manager for allocating data set pages read from the storage device into the buffers for concurrent access by both sequential and random processes. The computing apparatus is characterized by means for operating the processor to (1) establish a queue value; (2) maintain a normal least recently used (LRU) buffer chain and a sequential LRU buffer chain with the sequential LRU buffer chain replicated on the normal LRU buffer chain; (3) place buffers released from a sequential process that is not a prefetch process in both LRU buffer chains, and place buffers released from a random process or from a sequential prefetch process only in the normal LRU buffer chain; and (4) responsive to a request for a buffer for a sequential process, steal the head buffer from the sequential LRU buffer chain provided the number of buffers in that chain exceeds the queue value, otherwise steal the head buffer from the normal LRU chain, thereby preventing recursive steals of buffers employed in nested sequential processes.

The new apparatus may be further characterized by means for conditionally asynchronously prefetching data set pages from the external storage device in response to a request for a data set page which is an integral multiple of a process defined prefetch quantity.

DESCRIPTION OF THE PREFERRED EMBODIMENT

Figure 1:
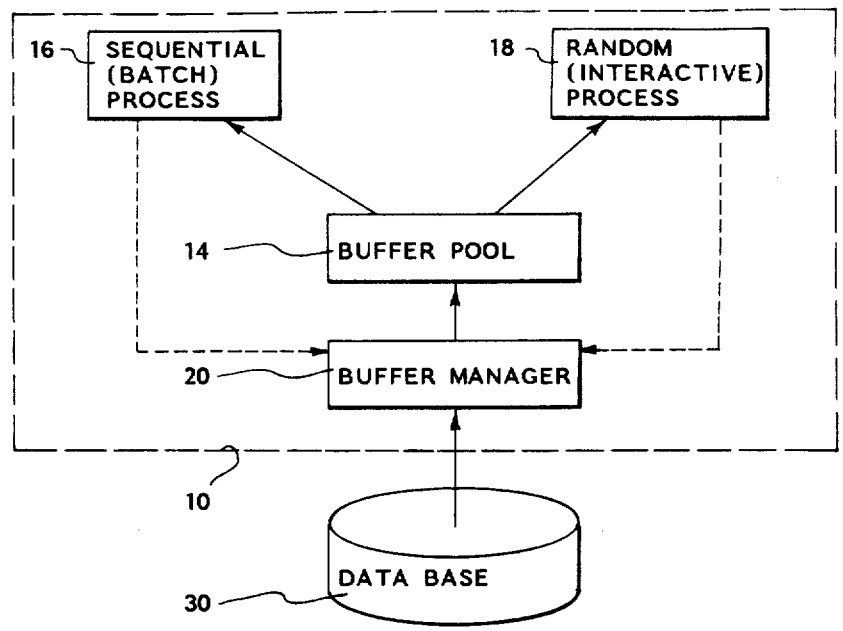
FIG. 1 is a diagram of a computing apparatus illustrating the environment of the invention.

Referring to FIG. 1, a description will be given of the computing apparatus of the invention. Computer 10 may be, for example, an IBM System/370, the architecture of which is described in IBM System/370 Principles of Operation, IBM Publication Ga22-7000-6, operating under control of an operating system, such as the IBM OS/MVS operating system. Operating under control of the operating system is a data base control system which includes buffer manager 20. Buffer pool 14 is provided within the virtual storage of processor 10, controlled by buffer manager 20, and accessed at sequential processes 16 and random processes 18. Under the control of buffer manager 20, data set pages required by processes 16, 18 are read into buffer pool 14 from data base 30 on external storage.

In accordance with this invention, buffer manager 20 provides support to enhance the performance of sequential processing of data with minimal impact to the performance of random processing. Thus, buffer manager 20 includes the control logic to minimize buffer pool monopolization by sequential process in environments where concurrency exists between access to data set pages assigned to buffer pool 14 by sequential processes 16 and random processes 18, and to provide asynchronous prefetch whereby data set pages residing on external storage 30 are brought into buffer pool 14 in anticipation of their access by sequential processes 16, for example. Data set pages may reside in buffer pool 14 and/or in external data base 30. The control logic of buffer manager 20 is based upon the assumption that the probability of reaccess to pages accessed by random processes 18 is much greater than that of reaccess to pages accessed by sequential processes 16.

Figure 2:
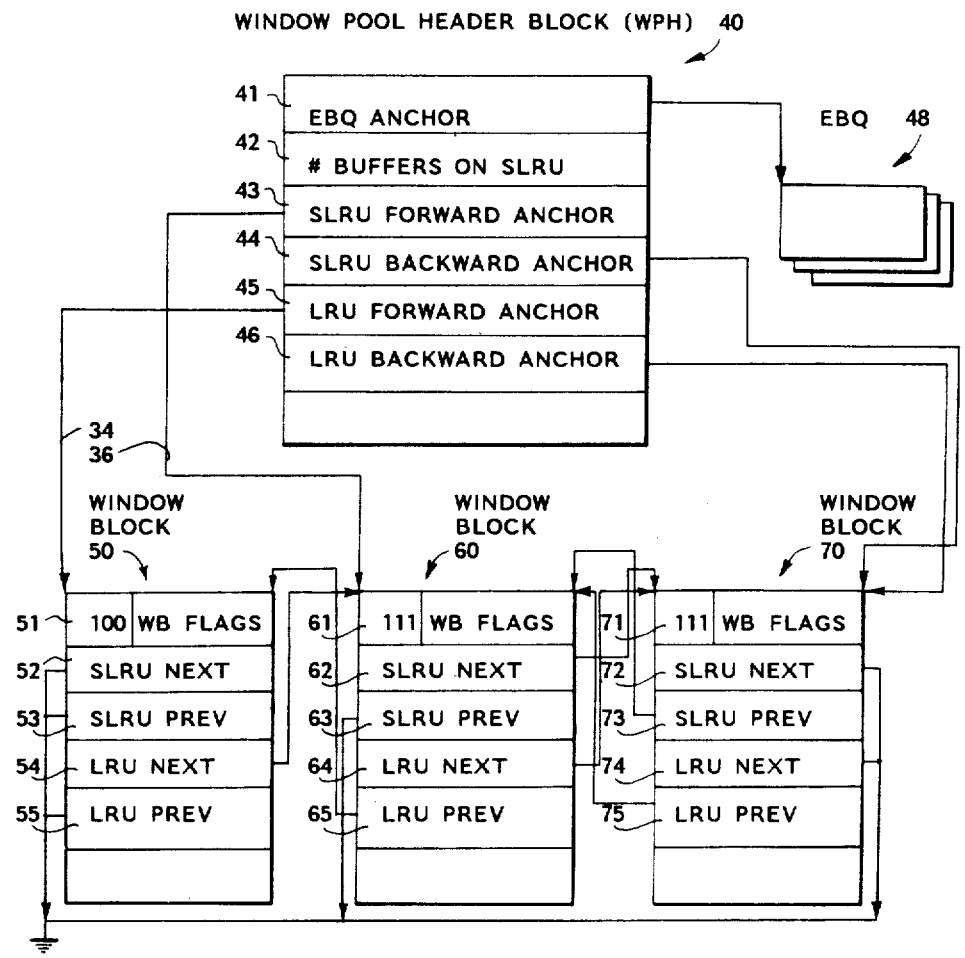
FIG. 2 is a diagram illustrating the normal and sequential LRU chains of the invention.

Referring to FIG. 2, buffer manager 20 maintains within buffer pool 14 two least recently used buffer chains: a normal (LRU) buffer chain 34 and a sequential (SLRU) buffer chain 36. The organization of buffers within the LRU and SLRU chains in buffer pool 14 will be described. A buffer control block set, created for each buffer pool 14 initialized by buffer manager 20, comprises one window pool header block 40 and a plurality of window blocks WB 50, 60, 70 . . . , with one window block WB for each buffer within buffer pool 14. The buffer control block of FIG. 2 resides within the virtual address space of processor 10. Window pool header block 40 includes excess block queue EBQ anchor field 41, containing a pointer to the first window block in queue 48 of excess window blocks; count field 42, which stores the count of the number of buffers on the SLRU chain; SLRU forward anchor field 43, which points to the head window block WB 60 in the SLRU chain; SLRU backward anchor field 44, which points to the tail window block WB 70 in the SLRU chain; LRU forward anchor field 45 which points to window block WB 50 at the head of the LRU chain; and LRU backward anchor 46, which points to window block 70 at the tail of the LRU chain.

Each window block 50, 60, 70 includes a WB flag field 51, 61, 71, respectively comprising three flag bits having the following significance (from left to right): bit 1 is set on (=1) if the window block is on the LRU chain; bit 2 is set on if the window block is on the SLRU chain; and bit 3 is set on if the window block was last used for sequential processing. Thus, WB flag field 51 value of 100 indicates that WB 50 is on the LRU chain, is not on the SLRU chain, and was not last used for sequential processing (as opposed to random processing). In the example of FIG. 2, window blocks 50, 60, and 70 are on the LRU chain and window blocks 60 and 70 are on the SLRU chain. Queue of excess window blocks 48 is normally empty once steady state usage of buffers in pool 14 has been reached. Window blocks 50, 60, 70 each also include four chain pointer fields, including: SLRU next pointer, SLRU previous pointer, LRU next pointer, and LRU previous pointer—each used in forward and reverse chaining the window blocks within LRU and SLRU chains. Fields 52, 53, 55, 63, 72, and 74 are set to null, whereas the other pointer fields contain values corresponding to the arrows in FIG. 2.

Figure 3:
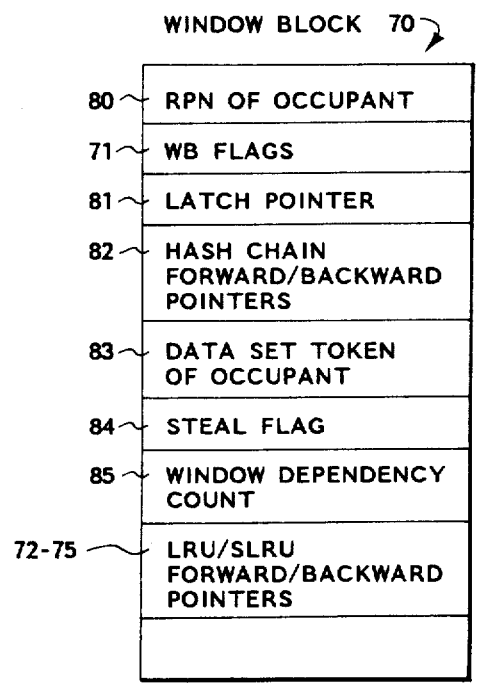
FIG. 3 is a diagram illustrating a window block.

Referring to FIG. 3, a description will be given of additional fields and uses of window block 70. Relative page number (RPN) field 80 gives the relative page number of the page occupying the buffer block corresponding to this window block. Latch pointer field 81 is used to serialize the hash chain search (also referred to as the look aside search) described below. Hash chain forward and backward pointers 82 are used to connect or link window blocks 70 . . . that hash to the same value, with each hash chain anchored to a field (not shown) in the window pool header block 40. Data set token of occupant field 83 is a field identifying, such as by key, the data set of the page presently occupying the buffer associated with this window block 70. Steal flag 84 is used to prevent multiple users from stealing the same buffer, and window dependency count field 84 gets incremented and decremented as users get and release the page within the buffer associated with this window block, as will be described more fully hereafter.

When a user 16, 18 requests a page from buffer manager 20, the request includes the data set token and the relative page number (RPN) of the required page. This value is hashed into a hash value, and a search made of all window blocks 70 . . . linked by hash chain pointers 82 as having the same hash value. This is referred to as the look-aside search. The search is successful if a window block is found having a data set token field 83 and an RPN field 80 matching the request.

Referring once again to FIG. 2, buffers released from sequential processing are placed on the tail of the SLRU chain and on the tail of the LRU chain, while buffers released from random processing are placed only on the tail of the normal LRU chain. Buffers required to satisfy sequential access requests are obtained from the head of the SLRU chain if the number of buffers residing on SLRU is greater than a sequential steal threshold value Q. Otherwise, if the number of buffers on SLRU is not greater than Q or if the request is for access by a random process, the buffer is obtained from the head of the normal LRU chain. This logic gives buffers recently used for sequential access a higher steal priority for new sequential requests than buffers last used for random access without altering buffer steal priority for new random requests, thus minimizing the monopolization effect of sequential processing.

The sequential steal threshold value Q is employed to minimize refetch activity in those cases where sequential processes must occasionally perform nested sequential access to out-of-line sequences of pages. An example of this is a reorganization utility 16 following a logical record sequence that is basically clustered but has occasional out-of-line (non-clustered) inserts. The buffers last referenced in main line sequences will tend not to be stolen to satisfy out-of-line sequence access requests since SLRU will not be used unless SLRU contains sufficient buffers less recently used than just released main line LRU sequence buffers. A reasonable value for Q may be established as the product of the number of levels of out-of-line nesting most often expected per sequential processing instance times the maximum number of concurrent sequential processing instances most often expected. A value of Q=4 may be a reasonable value, for example.

In cases where sequential processing is being performed against data base data, certain performance advantages can be realized if the data is asynchronously prefetched from external storage 30, such as a direct access storage device (DASD), to virtual storage buffers 14 prior to its actual use. These advantages are decreased I/O path length overhead due to I/O batching and decreased total elapsed time due to overlapped I/O. Prefetch occurs asynchronously as a side function of the buffer manager 20 page access function. Prefetch is accomplished by scheduling an asynchronous execution unit that acquires necessary buffers from buffer pool 14, loads them with the required data base pages, and then releases them to LRU status. As many of the required buffers as possible are acquired by prefetch from SLRU, but when buffers are released by prefetch, they are placed only on the LRU chain, and not on the SLRU. This is done to minimize refetch of not yet accessed prefetched buffers in cases where nested sequential access to out-of-line sequences of pages is required. The prefetched buffers are, however, placed on SLRU upon release after individual access by, say, some sequential process 16. Access to buffers containing prefetched data is effected through the normal page access procedures. In this example, the number of consecutive pages prefetched is a power of 2 value less than 64. This value is provided by callers 16, 18 that desire the prefetch function.

Prefetch will then be scheduled, by buffer manager 20 page access function, only when all of the following conditions are met:

1. The caller indicates sequential processing for the currently requested page.

2. A prefetch number of pages value is specified.

3. The currently requested page number (relative to the first page of the data set) is evenly divisible by the prefetch number of pages value. This is done to avoid the tracking necessary to prevent multiple prefetches from being initialized for the same pages by the same sequential process.

4. The buffer pool 14 contains sufficient reassignable buffers so that usage of some buffers for prefetch will not totally deplete the pool's supply of re-assignable buffers.

5. Prefetch will not occur outside the current physical data set bounds.

Prefetch starts at the current page number +1. The last page prefetched is the next sequential data set page whose page number is evenly divisible by the prefetch number of pages value. Thus, once a prefetch sequence has been initialized, all subsequent pages will have been prefetched prior to access as long as the sequence remains unbroken.

Figure 4:
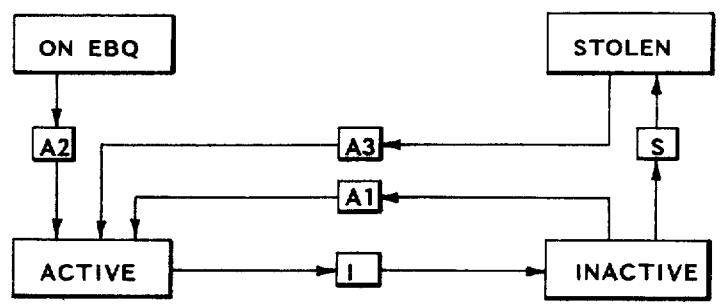
FIG. 4 is a state diagram illustrating the buffer states and state changes characterizing the buffer pool of FIG. 1.

Referring now to FIG. 4, a description will be given of buffer states and state changes. The four states shown are (1) ON EBQ, (2) ACTIVE, (3) INACTIVE, and (4) STOLEN. A buffer in state ON EBQ is represented by a window block 48 on the queue of excess window blocks, and is available for immediate use as it is not currently assigned to any data page. A buffer in state ACTIVE is in use by one or more data base processors 16, 18 and is locatable through a look-aside queue structure established by hash chain forward/backward pointers 82 and their anchors in WPH 40. A buffer in INACTIVE state is not in use by any data base processor 16, 18, but is findable through the look-aside queue structure. A buffer in state STOLEN is removed from the look-aside queue structure in preparation for reassignment to a different data base page for an incoming request.

Five state changes are illustrated in FIG. 4, including state changes A1, A2, S, A3, and I. State change A1 represents a buffer going from INACTIVE to ACTIVE state, and occurs when an INACTIVE buffer has been located through the look-aside queue structure containing a requested page. State change A2 represents a buffer going from EBQ 48 to an ACTIVE state, and occurs when a buffer is needed to satisfy an incoming request for a page which could not be located on the look-aside queue structure, and at least one buffer exists in EBQ 48. The buffer is inserted into the look-aside queue structure. State change S represents a buffer going from INACTIVE to STOLEN state. In this situation, the INACTIVE buffer has migrated to the head of the LRU or SLRU chain prior to an occurrence of state change A1, and is now being removed from the LRU/SLRU chains and the look-aside queue structure in order to satisfy an incoming request for a page which could not be located by way of the look-aside queue structure. Also, the incoming request for a page could not be satisfied by a state change A2, as there were no buffers in EBQ 48. State change A3 represents a buffer going from STOLEN to ACTIVE state. The just stolen buffer (state change S) is made active and placed into the look-aside queue structure. State change I represents a buffer going from ACTIVE to INACTIVE state. The count of buffer users has just been reduced to zero; consequently, the buffer is deleted from its current position (if any) within the LRU/SLRU chains and placed at the tail of the LRU chain and, possibly, at the tail of the SLRU chain.

Referring now to the tables, the procedures implementing the method and characterizing the apparatus of the invention will be set forth in pseudo-code. As will be apparent to those skilled in the art, the code representation of these procedures may readily be converted to executable code without undue experimentation.

TABLE 1

| BUFFER POOL MANAGER SCENARIO | |
|---|---|
| 0090 | 'Subsystem Initialization' |
| 0100 | Start up |
| 0110 | DO until all buffers initialized for this pool |
| 0120 | Initialize window block WB |

TABLE 1-continued
BUFFER POOL MANAGER SCENARIO

| | | |
|---|---|---|
| 0130 | Insert WB into EBQ | |
| 0140 | End; | |
| . | | |
| . | | |
| . | | |
| 0145 | 'User requests a single page without prefetch' | |
| 0150 | Call GET_PAGE | |
| . | | |
| . | | |
| . | | |
| 0160 | 'User releases page last requested' | |
| 0170 | Call RELEASE_PAGE | |
| . | | |
| . | | |
| . | | |
| 0180 | 'User request page with prefetch' | |
| 0190 | Call GET_PAGE | |
| . | | |
| . | | |
| . | | |
| 0200 | 'User releases page last requested' | |
| 0210 | Call RELEASE_PAGE | |
| . | | |
| . | | |
| . | | |
| 0220 | 'User requests a previously prefetched page' | |
| 0230 | Call GET_PAGE | |
| . | | |
| . | | |
| . | | |
| 0240 | 'User releases page last requested' | |
| 0250 | Call RELEASE_PAGE | |

TABLE 2
GET_PAGE

```
0300  GET_PAGE:
0310  Search buffer pool for page N
0320  IF page N not found THEN
0330  DO
0340  Attempt to acquire buffer from EBQ
0350  IF not successful THEN
0360  Call STEAL_BUFFER
0370  ELSE;
0380  END
0390  ELSE
0400  Increment dependency count
0410  Call INDICATE_STATUS
0420  IF PREFETCH_DRIVER called GET_PAGE THEN
0430  DO
0440  Save buffer address in list
0450  IF range completed
0460  Return to PREFETCH_DRIVER
0470  ELSE
0480  DO
0490  Set up for next page in range (N=next page)
0500  GO TO GET_PAGE (line 0300)
0510  END
0520  END
0530  ELSE
0540  DO
0550  Read page N into buffer if required
0560  IF sequential request
0570  AND a prefetch quantity is specified
0580  AND requested page number module prefetch
0581  quantity = 0
0590  AND a prefetch execution unit is available or
0591  creatable
0600  THEN (prefetch conditions are met)
0630  Asynchronously schedule PREFETCH_DRIVER
0640  ELSE;
0650  Return
0660  END;
0670  END (GET_PAGE);
```

TABLE 3
STEAL_BUFFER

```
0700  STEAL_BUFFER:
0710  Obtain buffer pool LRU latch
0720  DO UNTIL a useable buffer is found OR LRU chain
0721  is empty
0730  IF sequential request
0740  AND sufficient buffers exist on SLRU chain THEN
0750- Select SLRU chain
0760  ELSE
0770  Select LRU chain
0780  IF 1st buffer on selected chain is on SLRU THEN
0790  DO
0800  Dequeue buffer from SLRU
0810  Lower count of buffers on SLRU
0820  END
0830  ELSE;
0840  Dequeue buffer from LRU chain
0850  Attempt to steal just dequeued buffer
0860  IF stolen successfully THEN
0870  DO
0880  IF buffer marked for deletion
0890  AND not a "must complete" request THEN
0900  Inset buffer into local deleted buffer chain
0910  ELSE (this is a buffer we can use)
0920  DO
0930  Indicate buffer obtained
0940  Increment dependency count
0950  END
0960  END
0970  ELSE;
0980  END (DO UNTIL)
0990  Free the buffer pool LRU latch
1000  Return
1010  END (STEAL_BUFFER);
```

TABLE 4
INDICATE_STATUS

```
1100  INDICATE_STATUS:
1110  IF buffer dependency count just raised from 0 to 1 THEN
1120  DO
1130  IF request is for sequential page processing THEN
1140  WBSEQ = ON
1150  ELSE
1160  WBSEQ = OFF
1170  END
1180  ELSE
1190  IF request is not for sequential page processing THEN
1200  WBSEQ = OFF
1210  ELSE;
1220  Return
1230  END;
```

TABLE 5
PREFETCH_DRIVER

```
1300  PREFETCH_DRIVER:
1310  Indicate get-range request to get page
1320  Call GET_PAGE to obtain buffers for pages (N+1) to
1330  (N+1+prefetch_quantity)
1340  Read pages into buffers where required
1350  Call RELEASE_PAGE for each buffer obtained
1360  END;
```

TABLE 6
RELEASE_PAGE

```
1400  RELEASE_PAGE
1410  Lower dependency count by one
1420  IF dependency count = 0 THEN
1430  DO
1440  Get LRU latch
1450  IF buffer on LRU chain THEN
1460  DO
1470  If buffer on SLRU chain THEN
1480  DO
1490  Dequeue buffer from SLRU
```

TABLE 6-continued
RELEASE_PAGE

| | |
|---|---|
| 1500 | Lower SLRU buffer count by one |
| 1510 | END |
| 1520 | ELSE; |
| 1530 | Dequeue buffer from LRU chain |
| 1540 | END |
| 1550 | ELSE; |
| 1560 | Insert buffer to tail of LRU chain |
| 1570 | IF buffer used only sequentially |
| 1580 | AND caller is not PREFETCH_DRIVER THEN |
| 1590 | Insert buffer to tail of SLRU chain |
| 1600 | ELSE; |
| 1610 | Free LRU latch |
| 1620 | END; |
| 1620 | ELSE; |
| 1630 | END; |

We claim:

1. A method for operating a computing apparatus including a main processor, a plurality of main storage buffers, and at least one external storage device; the main processor being operated under control of a data base system which includes a buffer manager for allocating data set pages read from the storage device into the buffers for concurrent access by both sequential and random processes; the method being characterized by the steps of:

(1) establishing a sequential steal threshold value of a queue as the product of the number of levels of out-of-line nesting most often expected per sequential processing instance times the maximum number of concurrent sequential processing instances most often expected;

(2) maintaining a normal least recently used (LRU) buffer chain and a sequential LRU buffer chain with sequential buffers included in both chains and the random buffer included only in the normal LRU buffer chain;

(3) placing buffers released from a sequential process that is not a prefetch process in both LRU buffer chains, and placing buffers released from a random process or from a sequential prefetch process only in the normal LRU buffer chain; and (4) responsive to a sequential access request for a buffer, stealing the head buffer from the sequential LRU buffer chain provided the number of buffers in that chain exceeds the queue value, otherwise, stealing the head buffer from the normal LRU chain, because the number of buffers on the sequential LRU chain is not greater than the queue value or the request is for access by a random process, thereby preventing recursive steals of buffers employed in nested sequential processes.

2. The method of claim 1, further characterized by the step of (5) conditionally asynchronously prefetching data set pages from the external storage device to virtual storage buffers in response to a request for a data set page which is an integral multiple of a process defined prefetch quantity.

3. A method for preventing monopolization of a buffer pool by sequential processes sharing the buffer pool concurrently with random processes, comprising the steps of:

establishing a sequential steal threshold value of a queue as the product of the number of levels of out-of-line nesting most often expected per sequential processing instance times the maximum number of concurrent sequential processing instances most often expected;

maintaining a normal least recently used (LRU) buffer chain and a sequential LRU buffer chain with sequential buffers included in both chains and the random buffer included only in the normal LRU buffer chain;

placing buffers released from a sequential process that is not a prefetch process in both LRU buffer chains, and placing buffers released from a random process or from a sequential prefetch process only in the normal LRU buffer chain; and responsive to a request for a buffer for a sequential process, stealing the head buffer from the sequential LRU buffer chain provided the number of buffers in that chain exceeds the queue value, otherwise, stealing the head buffer from the normal LRU buffer chain because the number of buffers on the sequential LRU chain is not greater than the queue value or the request is for access by a random process.

* * * * *